(12) United States Patent
Sudhakar

(10) Patent No.: US 8,301,679 B2
(45) Date of Patent: Oct. 30, 2012

(54) COMPUTATION OF LOGARITHMIC AND EXPONENTIAL FUNCTIONS

(75) Inventor: Raghavan Sudhakar, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 1088 days.

(21) Appl. No.: 11/723,082

(22) Filed: Mar. 16, 2007

(65) Prior Publication Data

US 2007/0174378 A1   Jul. 26, 2007

Related U.S. Application Data

(62) Division of application No. 10/774,385, filed on Feb. 10, 2004, now abandoned.

(51) Int. Cl.
*G06F 7/38* (2006.01)

(52) U.S. Cl. .......................................... 708/490

(58) Field of Classification Search ............. 708/490, 708/620, 625, 277
See application file for complete search history.

(56) References Cited

U.S. PATENT DOCUMENTS

| | | | |
|---|---|---|---|
| 4,809,211 A | 2/1989 | Kronlage | |
| 5,331,582 A | 7/1994 | Sudo et al. | |
| 5,659,495 A * | 8/1997 | Briggs et al. | 708/523 |
| 5,951,629 A * | 9/1999 | Wertheim et al. | 708/517 |
| 6,421,698 B1 | 7/2002 | Hong | |
| 6,510,445 B2 | 1/2003 | Takano | |
| 6,711,596 B1 * | 3/2004 | Coleman | 708/277 |
| 6,732,132 B2 | 5/2004 | Sogo | |
| 6,976,043 B2 * | 12/2005 | Clifton | 708/277 |
| 7,010,562 B2 | 3/2006 | Miyano | |
| 7,539,717 B2 * | 5/2009 | Hussain | 708/277 |

* cited by examiner

*Primary Examiner* — Tan V. Mai

(74) *Attorney, Agent, or Firm* — Pillsbury Winthrop Shaw Pittman LLP

(57) ABSTRACT

Efficiency of computation of logarithmic and exponential functions may be improved using multiplication by pre-computed coefficients to obtain intermediate products.

18 Claims, 12 Drawing Sheets

COMPUTATION OF LOGARITHMIC AND EXPONENTIAL FUNCTIONS

CROSS-REFERENCE TO RELATED APPLICATION

This is a divisional of U.S. application Ser. No. 10/774,385, filed Feb. 10, 2004, which is relied upon and incorporated herein by reference.

BACKGROUND OF THE INVENTION

In addition to their roles in mathematical libraries, logarithmic and exponential functions (or anti-logarithms) of real numbers play important roles in many applications. For example, in wireless communications, such functions may arise in computing received signal strength indicators (RSSIs), log-likelihood ratios in demodulators and decoders, etc. Further contexts in which they also may arise include speech compression and coding, image contrast enhancement, cryptography and reliability analyses, and digital signal processor (DSP) design. However, many past implementations of these functions have lacked desired speed and/or accuracy.

BRIEF DESCRIPTION OF THE DRAWINGS

Various embodiments of the invention will now be described in connection with the associated drawings, in which.

DETAILED DESCRIPTION OF EMBODIMENTS OF THE INVENTION

Figure 1A:
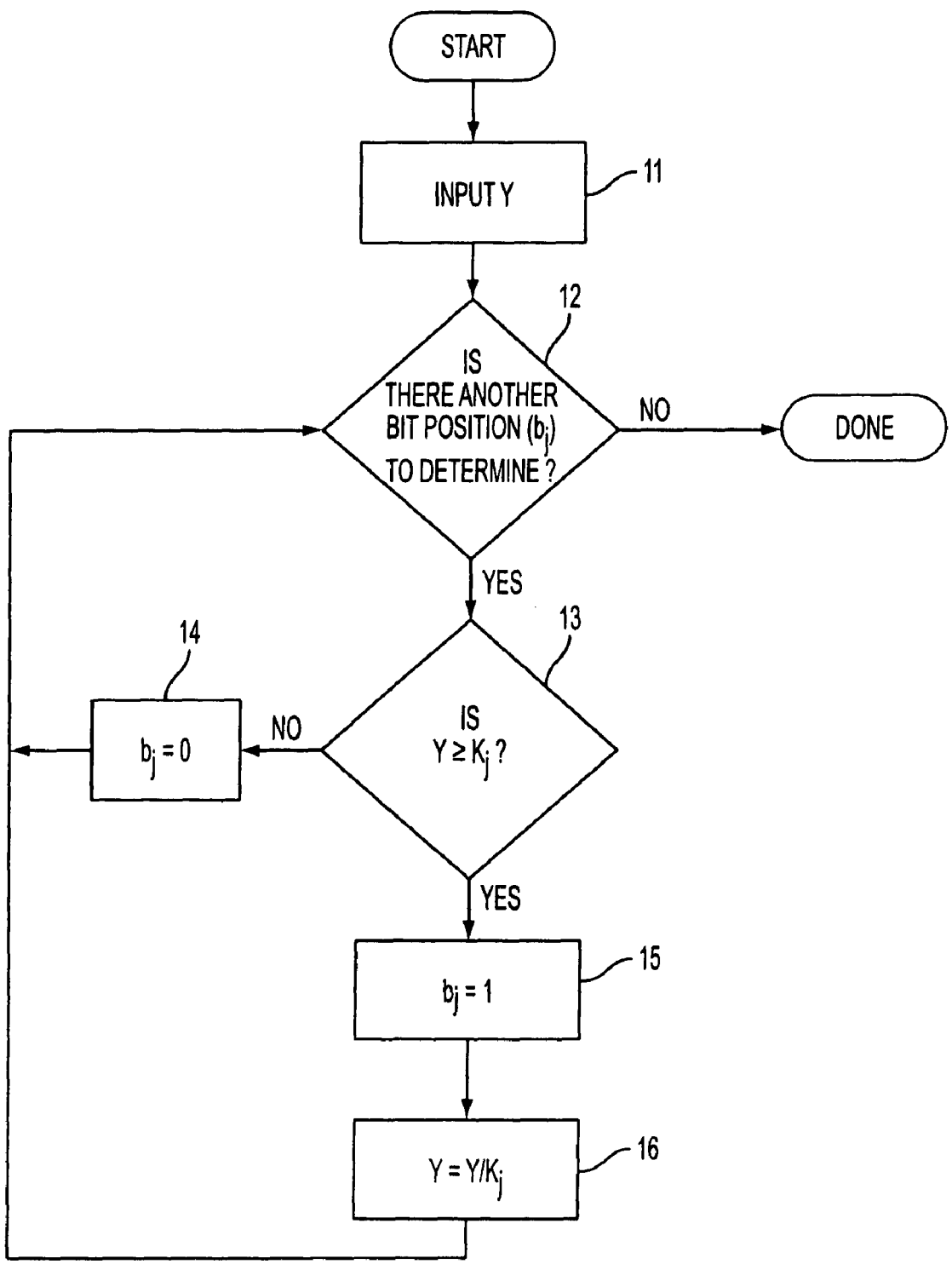
FIGS. 1A and 1B depict flowcharts of computational methods for logarithmic functions according to exemplary embodiments of the invention.

In the following description, numerous specific details are set forth. However, it is understood that embodiments of the invention may be practiced without these specific details. In other instances, well-known circuits, structures, and/or techniques have not been shown in detail in order not to obscure an understanding of this description.

References to "one embodiment", "an embodiment", "example embodiment", "various embodiments", etc., indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments of the present invention may include apparatuses for performing the operations herein. An apparatus may be specially constructed for the desired purposes, or it may comprise a general purpose device selectively activated or reconfigured by a program stored in the device.

Embodiments of the invention may be implemented in one or a combination of hardware, firmware, and software. Embodiments of the invention may also be implemented as instructions stored on a machine-accessible medium, which may be read and executed by a computing platform to perform the operations described herein. A machine-accessible medium may include any mechanism for storing or transmitting information in a form readable by a machine (e.g., a computer). For example, a machine-accessible medium may include read only memory (ROM); random access memory (RAM); magnetic disk storage media; optical storage media; flash memory devices; electrical, optical, acoustical or other form of propagated signals (e.g., carrier waves, infrared signals, digital signals, etc.), and others.

It may be noted that, in general, if one is capable of computing base-2 logarithms and exponentials, one may obtain other logarithmic and exponential functions based on these results by means of constant multiplication. For example, $\ln(Y)=(0.6391)(\log_2 Y)$, $\log_{10} Y=(0.3010)(\log_2 Y)$, $e^X=2^{1.4427X}$, and $10^X=2^{3.3219X}$. Hence, if one has methods for obtaining base-2 logarithms and exponentials, the same methods may be used to compute other logarithmic and exponential functions.

Figure 1B:
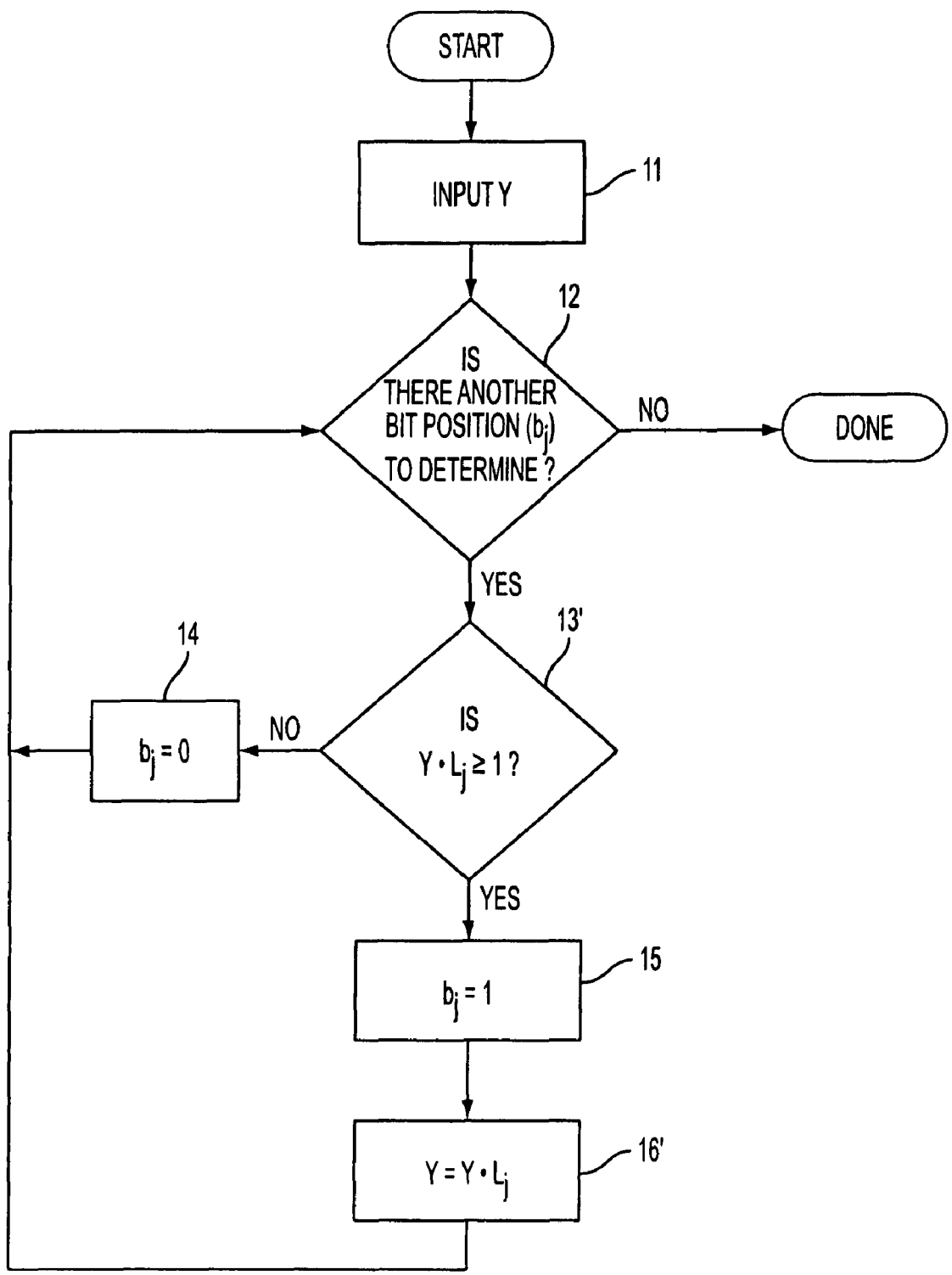

FIGS. 1A and 1B depict flowcharts showing ways of computing the base-2 logarithm of a number Y according to various embodiments of the invention. A way in which the base-2 logarithm of Y may be computed is to compare Y to a power of 2, beginning from a greatest power of 2 under consideration. If Y is greater than or equal to the power of 2 under consideration, a bit corresponding to that power of 2 in a binary representation of $\log_2 Y$ may be set to 1; otherwise, that same bit may be set to 0. This method may be implemented according to the flowchart of FIG. 1A.

In FIG. 1A, in block 11, Y may be input. Prior to determining $\log_2 Y$, a number of bits may be set for a binary representation of $\log_2 Y$, of which some may represent an integer portion of $\log_2 Y$, and some may represent a decimal portion of $\log_2 Y$. Beginning with a most significant bit (MSB) of this binary representation of $\log_2 Y$, block 12 may determine whether or not all bits of the binary representation of $\log_2 Y$ have been considered. If all bits have been considered, the process may be complete. Otherwise, the process may consider a next bit of the representation, to be denoted $b_j$, and may accordingly proceed to block 13.

In block 13, the process may determine if Y is greater than or equal to a $j^{th}$ power of 2, denoted $K_j$. To understand this, it may be useful to consider that a number, Y, may be expressed as $2^{\log_2 Y}$. $\log_2 Y$, in turn, may be expressed in the form $\ldots +b_2 2^2 + b_1 2^1 + b_0 2^0 + b_{-1} 2^{-1} + b_{-2} 2^{-2} + \ldots$, where, as discussed above, $b_j$ represents the $j^{th}$ bit of the binary representation of $\log_2 Y, \ldots b_2 b_1 b_0 . b_{-1} b_{-2} \ldots$. Given this, Y may further be expressed in the form $\ldots K_2^{b_2} \cdot K_1^{b_1} \cdot K_0^{b_0} \cdot K_{-1}^{b_{-1}} \cdot K_{-2}^{b_{-2}} \ldots$, where $K_j = 2^{2^j}$. These are the values of $K_j$ that may be tested against Y in block 13.

If $Y \geq K_j$, then $b_j$ may be set equal to 1, block 15, and $K_j$ may be removed from Y by division, block 16 (i.e., $Y = Y/K_j$). The process may then loop back to block 12 to determine if there are further bits to consider. If, on the other hand, $Y < K_j$, $b_j$ may be set equal to 0, block 14, and the process may, once again, loop back to block 12.

The flowchart of FIG. 1B presents a variation on the flowchart of FIG. 1A. In particular, the division by $K_j$ (i.e., in block 16) may be accomplished, equivalently, by a multiplication by $L_j = 1/K_j$. This is reflected in block 16' and is also used to present an alternative test that may be applied in block 13'. To further explain, the test of block 13' may be observed to be identical to that of block 13 (of FIG. 1A) by noting that both sides of the inequality of block 13 may be divided by $K_j$, and $L_j$ may then be substituted for $1/K_j$.

Figure 2:
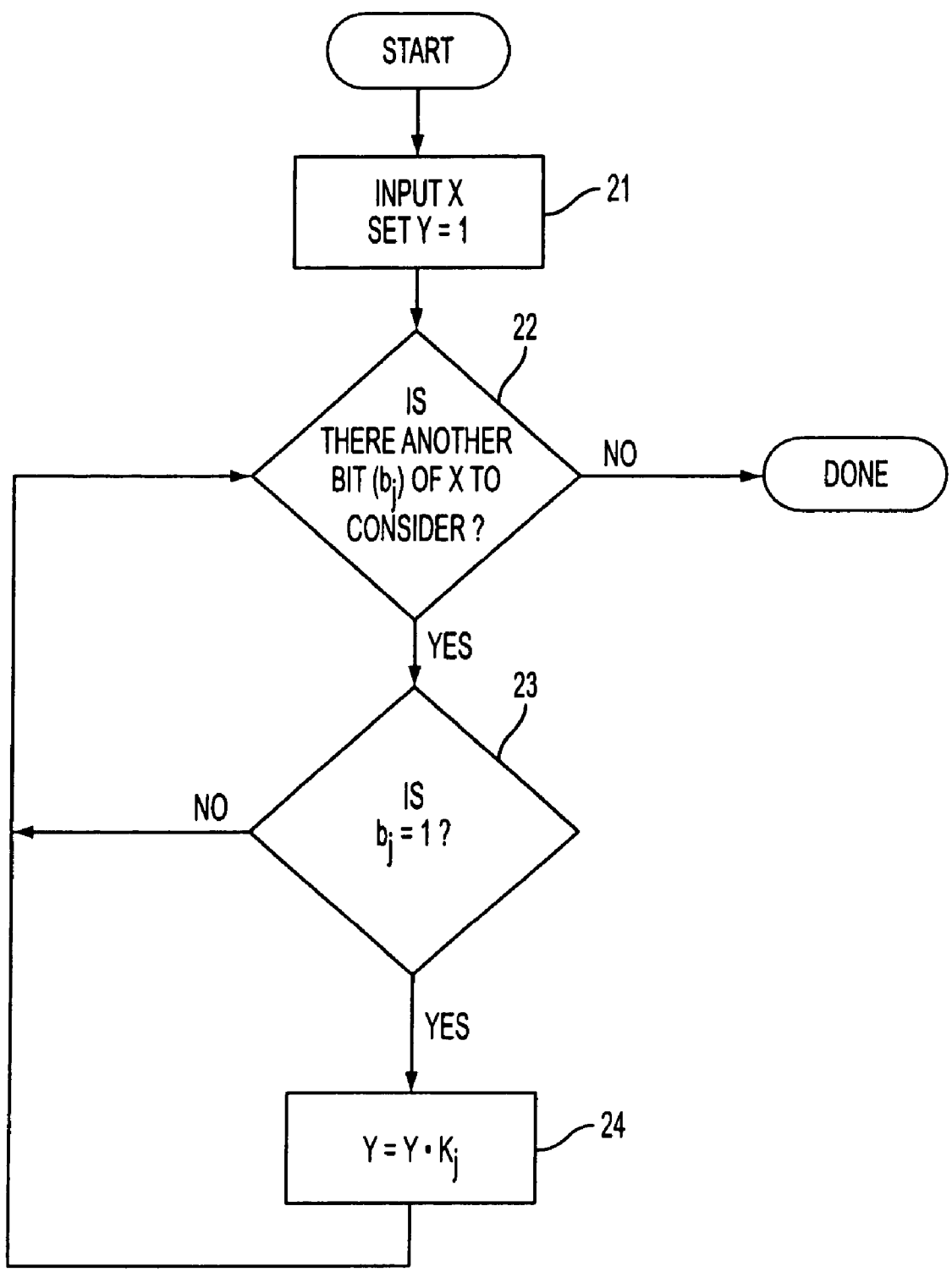
FIG. 2 depicts a flowchart of a computational method for exponential functions according to an exemplary embodiment of the invention.

FIG. 2 depicts a flowchart showing an exemplary method of computing a base-2 exponential function, according to an embodiment of the invention. In other words, the flowchart may be used to compute $Y = 2^X$. As above, X may be considered in binary form as $\ldots b_2 b_1 b_0 . b_{-1} b_{-2} \ldots$, and therefore, $2^X = \ldots K_2^{b_2} \cdot K_1^{b_1} \cdot K_0^{b_0} \cdot K_{-1}^{b_{-1}} \cdot K_{-2}^{b_{-2}} \ldots$. Hence, Y may be computed by a product of all $K_j$ for which $b_j = 1$ (note that when $b_j = 0$, $K_j^{b_j} = K_j^0 = 1$). This may be implemented by the flowchart of FIG. 2.

In FIG. 2, X may be input, and Y may be initially set equal to one, block 21. In block 22, the process may determine if all bits $b_j$ of the binary representation of X have been considered. If there is still a bit $b_j$ to consider, the process may continue to block 23, where it may test if $b_j = 1$. If $b_j = 1$, then the process may continue to block 24, and Y may be computed as $Y = Y \cdot K_j$. The process may then loop back to block 22 to test if there are further bits to examine. If, on the other hand, $b_j = 0$, the process may simply loop back to block 22 from block 23.

It may be possible to obtain computational savings in computing both the base-2 logarithm of a number and the base-2 exponential of a number by separately considering integer and non-integer portions. In particular, it may be noted that the integer portion of the base-2 logarithm of a number Y may be determined simply by examining the binary representation of Y and determining the power of 2 corresponding to the MSB of that binary representation. For example, in the case of $Y = (99)_{10} = (1100011)_2$, the MSB of the binary representation of Y occurs in the position corresponding to $2^6$, so the integer portion of $\log_2 Y$ may be set equal to 6.

In the case of an exponential function, it may be noted that, in a computer, multiplications by powers of 2 may be accomplished by shift operations. Hence, once the non-integer portion of $2^X$ is computed, it may be left-shifted, accordingly, to account for the integer portion.

As a result of these observations, in both the computation of base-2 logarithmic functions and the computation of base-2 exponential functions, computational savings may be realized by considering the integer portions separately and only using processes, such as those depicted in the flowcharts of FIGS. 1A, 1B, and 2, for the non-integer portions.

Figure 3A:
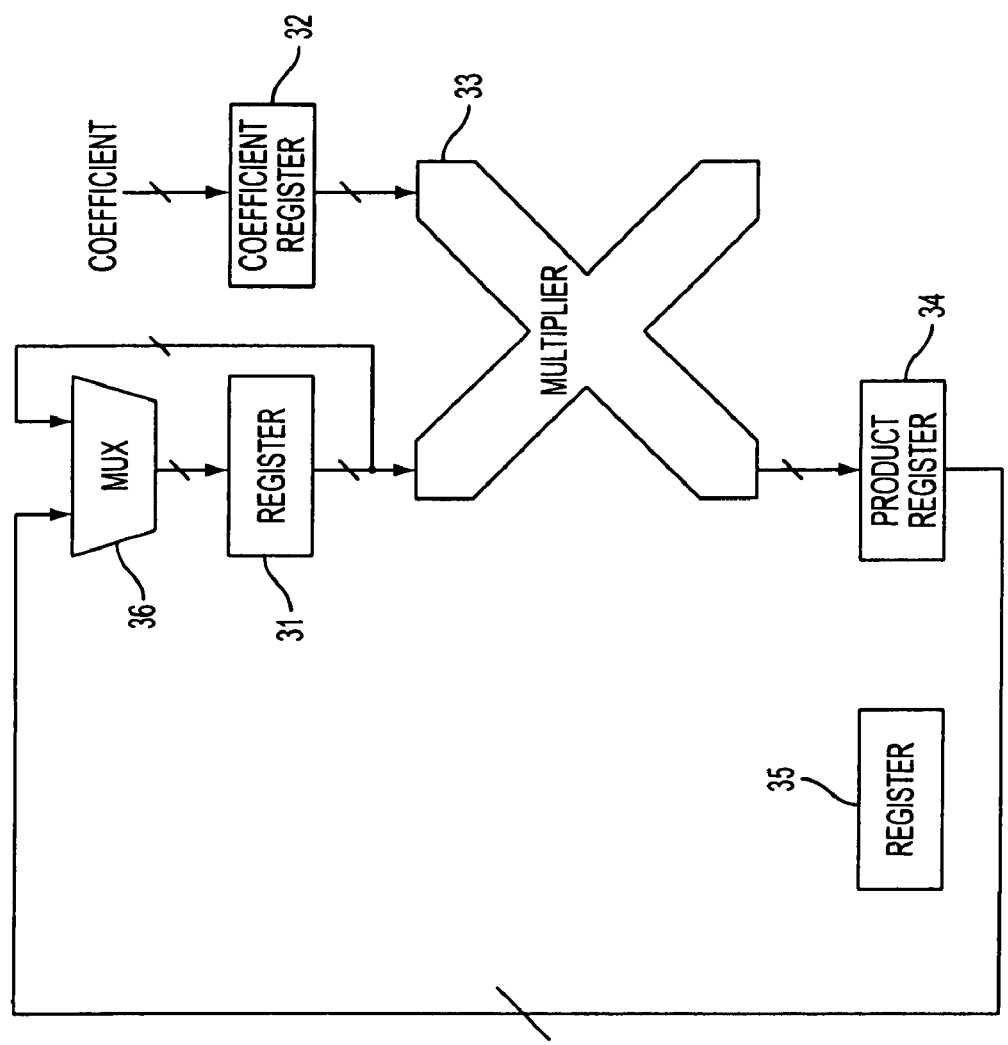
FIGS. 3A, 3B, 3C, 3D, and 3E depict conceptual block diagrams of systems implementing exemplary embodiments of the invention.

The above-described processes may suggest hardware implementations that may be used to efficiently compute base-2 logarithmic and/or exponential functions. In particular, FIG. 3A provides a block diagram of an apparatus that may be used to implement either or both functions, according to an embodiment of the invention. In FIG. 3A, the apparatus may include a first register 31 and a coefficient register 32. Register 31 may be used to store the number Y, as used above, in computing either the logarithm or the exponential function. Coefficient register 32 may be used to store either $L_j$ or $K_j$, depending upon the function being implemented. Since, in some embodiments of the invention, the coefficients may be required only for computation of the fractional portion of the result, only the negatively-indexed coefficients (i.e., $L_j$ or $K_j$ for j less than zero) may need to be stored. The coefficients may, in some embodiments of the invention, be stored in one or more machine-accessible media, such as look-up tables (LUTs), read-only memories (ROMs), random access memories (RAMs), disks, etc., and read from the machine accessible medium or media into coefficient register 32. The contents of register 31 and coefficient register 32 may be provided to multiplier 33. In an exemplary embodiment of the invention, multiplier 33 may be a 16×16 fractional unsigned multiplier, and each of registers 31 and 32 may be a 16-bit register (as well as registers 34 and 35, which will be discussed below). The output of multiplier 33, which may represent the product of the contents of registers 31 and 32, may be stored in a product register 34. Note that in the exemplary embodiment of the invention in which a 16×16 fractional unsigned multiplier and 16-bit registers may be used, as discussed above, the two 16-bit unsigned inputs from registers 31 and 32 may be multiplied (as unsigned integers) to obtain a 32-bit intermediate result, whose upper sixteen bits may be rounded and placed into the 16-bit product register 34. The contents of product register 34 and register 31 may be fed to a multiplexer 36 whose output may be used as a next input to be loaded into register 31. Which output is fed to register 31 may be determined by a select signal (not shown) that may depend upon which function is being computed. The apparatus of FIG. 3A may also include a further register 35, which may be used to store a number X, as used in the discussions above (i.e., in the case of the logarithm, $X = \log_2 Y$, and in the case of the exponential, $Y = 2^X$); in the case of the logarithm, this may be the result, and in the case of the exponential, this may be an initial number whose exponential may be computed. The specific uses of register 35 will be further discussed below.

Figure 3B:
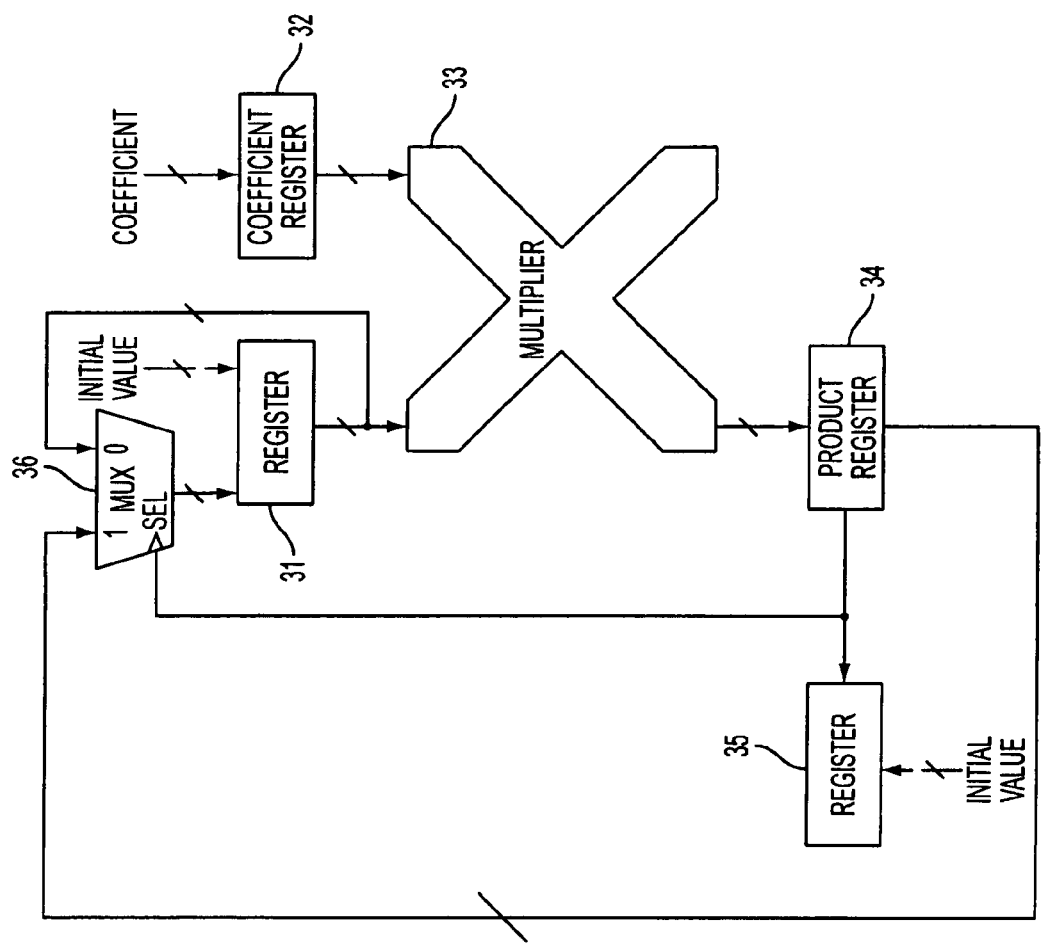

FIG. 3B shows an adaptation of the apparatus of FIG. 3A according to an embodiment of the invention. The apparatus of FIG. 3B may be used to compute the base-2 logarithm of a number Y. In the embodiment of FIG. 3B, the coefficients may correspond to the $L_j$'s discussed above. Furthermore, register 31 may be initialized to contain Y; in some embodiments, in which only the non-integer portion is computed by the methods discussed above, register 31 may be initialized with the non-integer portion of Y, left-shifted such that the MSB of Y is left-justified, and in those same embodiments, register 35 may be initialized with the integer portion of $\log_2$ Y. In FIG. 3B, the MSB of product register 34 may provide each successive bit of the fractional portion of $\log_2$ Y for shifting into register 35 (i.e., register 35 may be left-shifted with the MSB of product register 34 as the input bit for each successive bit, as it is determined) and may be used to select whether or not the contents of product register 34 replace Y in register 31 for computing the next bit of $\log_2$ Y. Referring back to FIG. 1B, this may implement the operations described in blocks 13', 14, 15, and 16' in that the product register 34 may contain $Y \cdot L_j$, whose MSB may represent $b_j$, which may be one or zero, depending upon whether the product is greater than or equal to one or less than one.

Figure 3C:
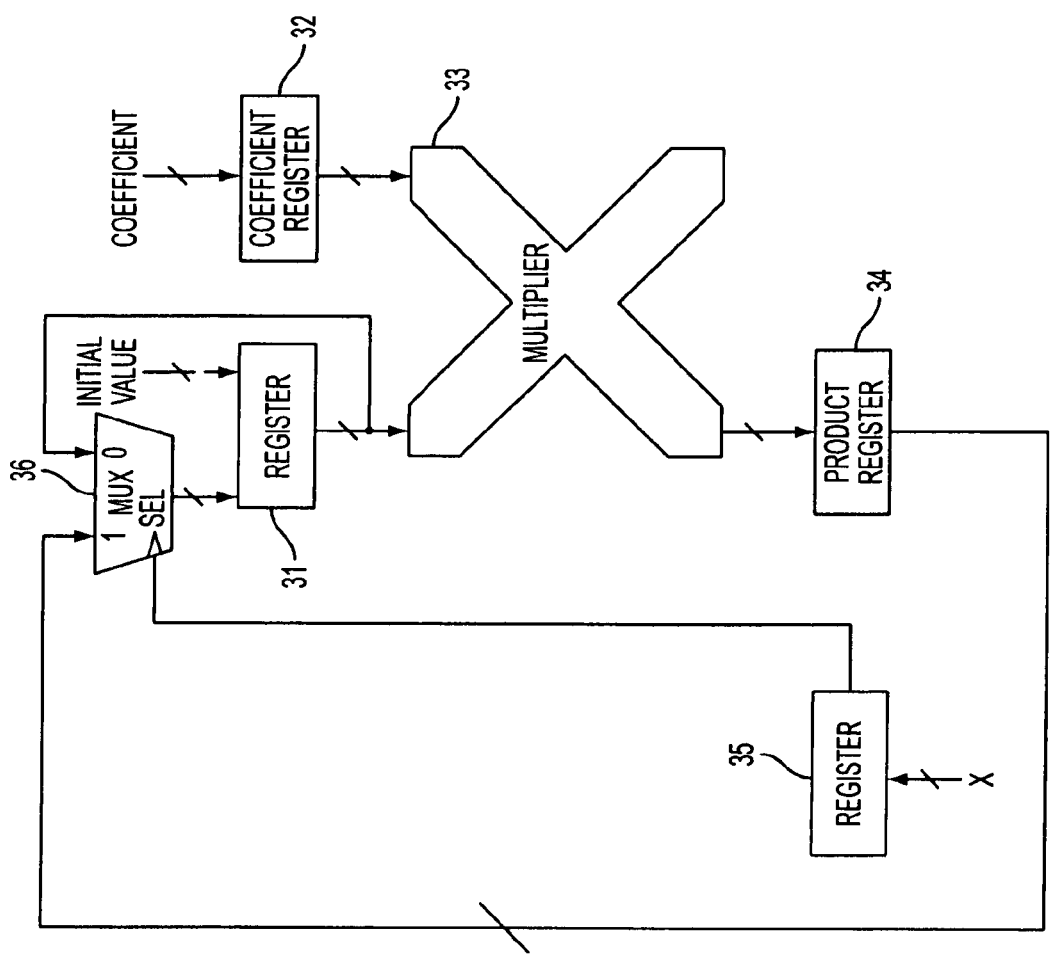

Similarly, FIG. 3C shows an adaptation of the apparatus of FIG. 3A according to a further embodiment of the invention. The apparatus of FIG. 3C may be used to compute the base-2 exponential of a number X. In FIG. 3C, the coefficients may correspond to the $K_j$'s discussed above. Register 31, which may ultimately store the desired result, is initialized. If, as discussed above in connection with some embodiments of the invention, only the fractional portion of Y is being computed by the apparatus of FIG. 3C, register 31 may be set to all ones; in other embodiments, Y may be set equal to one. Register 35 may be initialized with X. For each successive bit of X, beginning with the least significant bit (LSB), the LSB of X may be used to select whether the contents of the product register 34 or the contents of register 31 may be loaded into register 31 to provide the next value of Y. Hence, register 35 may be right-shifted to provide each successive bit. Referring back to FIG. 2, the apparatus of FIG. 3C may implement the operations of blocks 23 and 24 in that product register 34 may contain the product $Y \cdot K_j$, and this product may or may not become the next Y, depending upon the value of the LSB of register 35, which may provide $b_j$.

Figure 3D:
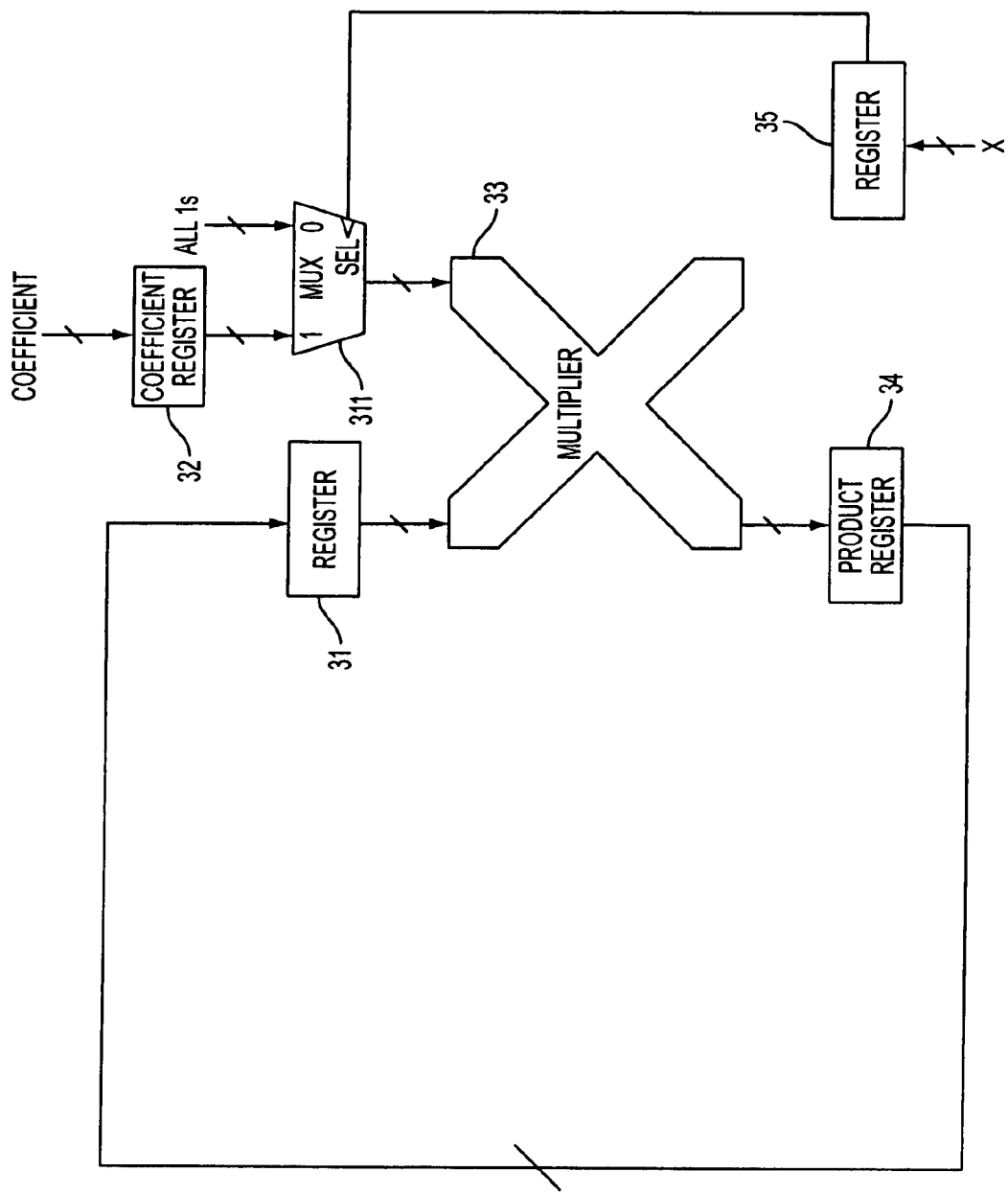

FIG. 3D shows an adaptation of the apparatus of FIG. 3A according to a further embodiment of the invention. The apparatus of FIG. 3D may be used to compute the base-2 exponential of a number X and is a variation on the embodiment of FIG. 3C. As in FIG. 3C, the coefficients may correspond to the $K_j$'s discussed above. Register 31, which may ultimately store the desired result, is initialized. If, as discussed above in connection with some embodiments of the invention, only the fractional portion of Y is being computed, register 31 may be set to all ones; in other embodiments, Y may be set equal to one. Register 35 may be initialized with X. For each successive bit of X, beginning with the least significant bit (LSB), the LSB of X may be used to select whether the contents of the coefficient register 32 or all ones may be input into multiplier 33 to form a product with the contents of register 31, and thus to provide the next value of Y. This is reflected by the use of multiplexer 311, which may use the LSB of X input as a select input (if the LSB of X is zero in FIG. 3D, all ones are input; if the LSB of X is one, the coefficient is input). Note that multiplexer 311 should not be understood as being strictly limited to a multiplexer, but rather, it may comprise any appropriate selection logic, known or as yet to be developed. Hence, register 35 may be right-shifted to provide each successive bit. Referring back to FIG. 2, the apparatus of FIG. 3D may implement the operations of blocks 23 and 24 in that product register 34 may contain the product $Y \cdot K_j$, and this product may become the next value of Y and may be loaded into register 31.

It may be noted that a further variation on the embodiment of the invention shown in FIG. 3D may switch the order of coefficient register 32 and multiplexer (or other selection logic) 311. That is, multiplexer 311 may receive as inputs both a coefficient and a constant value (which may be all ones in the case of computing the fractional portion of a base-2 exponential function), and the selected input may be provided for loading into coefficient register 32.

One difference that may be noted in the operations carried out by FIGS. 3B and 3C/3D is the order in which bits are considered. In FIG. 3B, the MSB of the product register may provide the next highest-order bit of the result, and accordingly, the coefficients Lj are considered from j equal to the highest-order bit designation (e.g., in an embodiment of the invention in which only fractional portions of the result are being computed, if the highest order bit were to correspond to $2^{-1}$ (j=−1), the process might begin by loading $L_{-1}$ into coefficient register 32) to the lowest-order bit designation (e.g., if the lowest order bit were to correspond to $2^{-6}$ (j=−6), $L_{-6}$ might be the last coefficient to be loaded). In contrast, in FIGS. 3C and 3D, the LSB of the number whose exponential is to be computed may provide the next bit to be considered; that is, the apparatus may proceed from lowest order to highest order (bits of the exponent). For example, in the case of j=−1 to −6, the apparatus may load $K_{-6}$ first and $K_{-1}$ last.

Figure 3E:
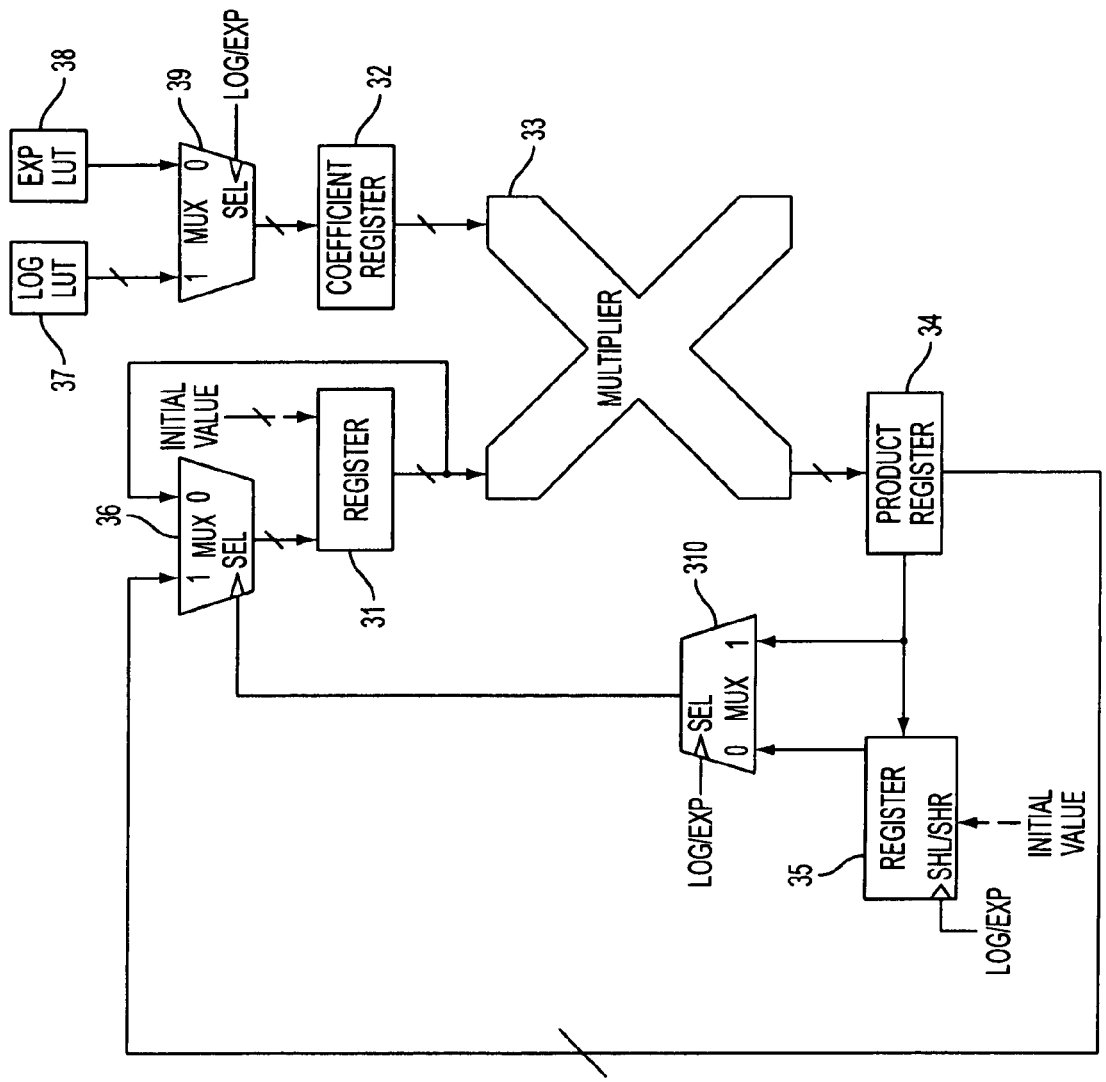

FIG. 3E provides a further embodiment of the apparatus of FIG. 3A, which may be configured so as to be useful in computing a base-2 logarithm or a base-2 exponential. As discussed above, the coefficients to be used in computing either or both of the logarithm and the exponential may be pre-computed and stored in one or more LUTs (or other machine-accessible media). In FIG. 3E, the $L_j$'s that may be used for computing logarithms may be stored in a log LUT 37, and the $K_j$'s that may be used in computing exponentials may be stored in an exp LUT 38. A function selection signal, labeled "LOG/EXP" in FIG. 3E, may be used as a select input to multiplexer 39 (which may be embodied, alternatively, as any other selection logic) to determine whether the coefficients are chosen from LUT 37 or LUT 38. It may be noted that, in the specific embodiment shown in FIG. 3E, LOG/EXP=1 has been arbitrarily chosen to designate computation of a logarithm, and LOG/EXP=0 has been arbitrarily chosen to designate computation of an exponential. However, one of ordinary skill in the art would understand that these designations may be reversed, enhanced, etc., as desired. The LOG/EXP signal may also be provided as a SHIFT SELECT input to register 35, to determine whether register 35 may shift right or shift left.

In addition to the above, the computations of logarithm and exponential may utilize either the MSB of product register 34 or the LSB of register 35, respectively, to be provided as a select input to multiplexer 36 to determine the next contents that may be loaded into register 31. To accommodate this, a multiplexer (or other selection logic) 310 may be provided with the aforementioned MSB and LSB and may use the LOG/EXP signal as a select input to determine which may be forwarded to multiplexer 36.

Finally, while not shown in FIG. 3E, additional logic may be provided to account for different initial values that may be loaded into registers 31 and 35. Such additional logic may employ further multiplexers and/or other selection logic to determine, based on, for example, the LOG/EXP signal, appropriate values that may be initially loaded. The initial values may depend upon the desired object of the computation (e.g., logarithm or exponential).

Figure 4A:
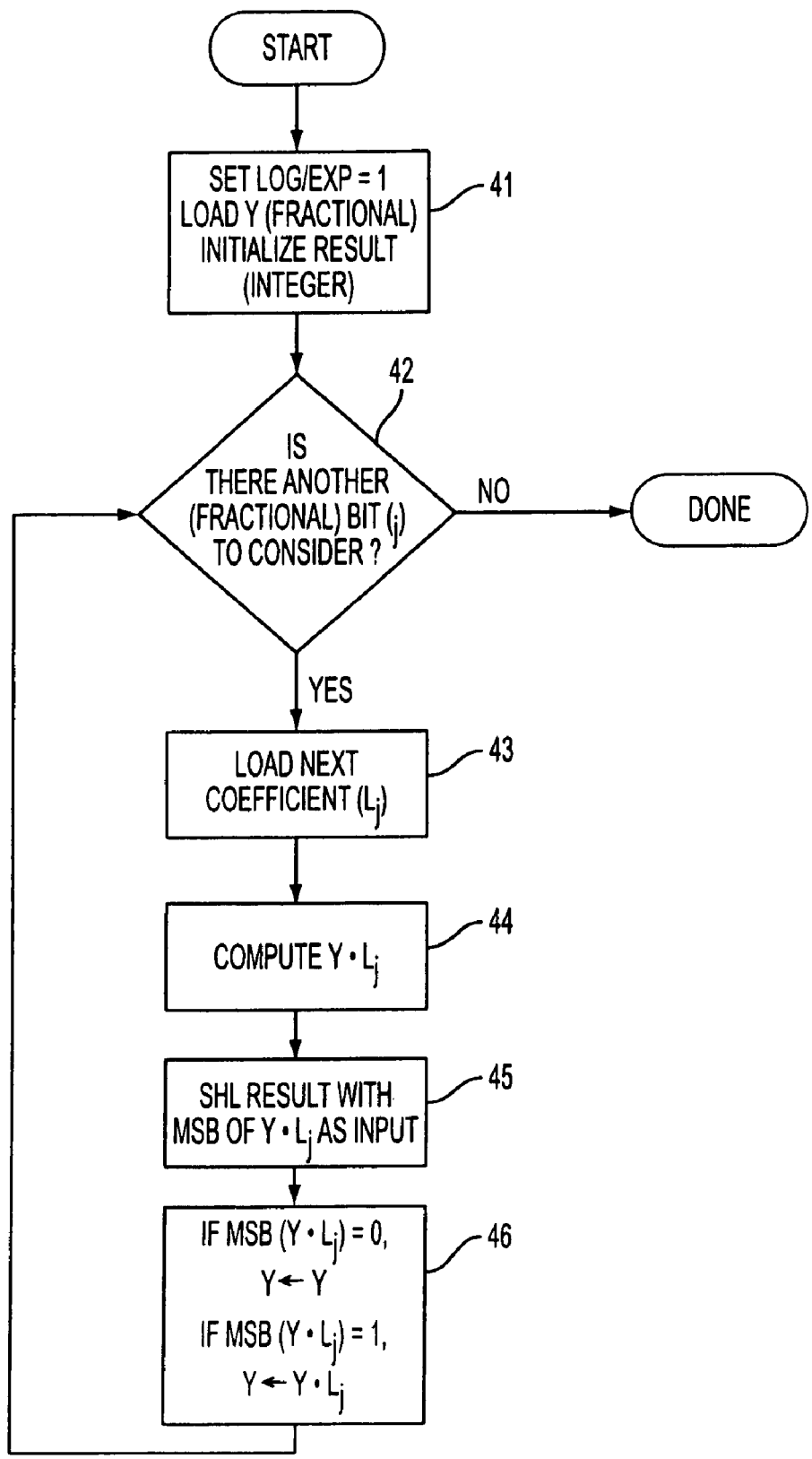
FIGS. 4A and 4B depict flowcharts of computational methods for logarithmic and exponential functions using the system of FIG. 3, according to exemplary embodiments of the invention.
Figure 4B:
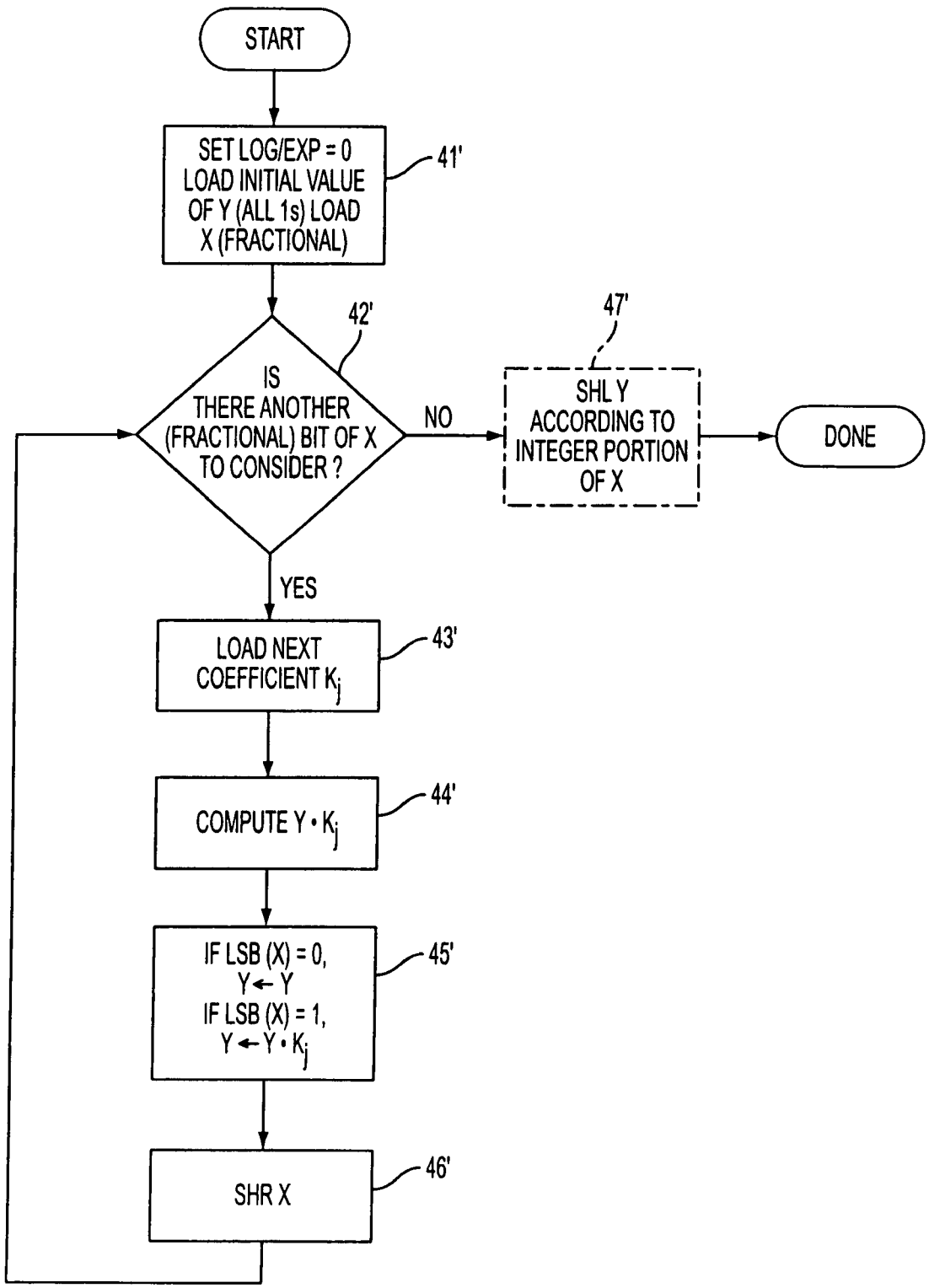

FIGS. 4A and 4B depict flowcharts of exemplary processes utilizing the apparatus of FIGS. 3A-3E, according to some embodiments of the invention. The process depicted in FIG. 4A may be used to compute the base-2 logarithm of a number, Y. Accordingly, as reflected in block 41, if, for example, the apparatus shown in FIG. 3D were to be used, the LOG/EXP signal may be set to one, to reflect that the desired operation is logarithm. Also in block 41, the number Y may be loaded, for example, into register 31, and a register that may later contain the result of the computation, e.g., register 35, may be initialized. In some embodiments of the invention, as discussed above, only the left-justified fractional portion of Y may be loaded, and the result register may be initialized to contain the integer portion of the result (which may be predetermined, as discussed above).

As discussed above, the method of computing the logarithm may proceed beginning with the bit position corresponding to the MSB of Y (or, in some embodiments, of the fractional portion of Y). In block 42, the process may determine if there are any further bits (i.e., bit positions) to consider. If not, the process may be complete. Otherwise, the process may proceed to block 43 and may load a coefficient, $L_j$, corresponding to a next bit position, into, for example, coefficient register 32. The process may then use, for example, multiplier 33 to compute the product $Y \cdot L_j$, block 44. The process may next proceed to block 45 and left-shift the result register (e.g., register 35) using the MSB of the product, $Y \cdot L_j$ as an input bit. Also, in block 46, the process may determine, based on the value of the MSB of the product, $Y \cdot L_j$, whether the next value of Y (e.g., in register 31) may be loaded to the product, $Y \cdot L_j$, or may remain the same (e.g., reloaded with the same value of Y). The process may then loop back to block 42 and may determine whether there are still bits to consider.

The process depicted in FIG. 4B may be used to compute the base-2 exponential of a number, X. Accordingly, as reflected in block 41', if, for example, the apparatus shown in FIG. 3E were to be used, the LOG/EXP signal may be set to zero, to reflect that the desired operation is exponential. Also in block 41', the result, Y, may be initialized, for example, in register 31 (in the case in which the fractional portion is computed, as in some embodiments, Y is initialized to be all ones). Additionally, the number, X, may be loaded into the apparatus (e.g., into register 35); as discussed above, in some embodiments, only the fractional portion of X may be loaded.

As discussed above, the bits of X may be considered sequentially, beginning with the LSB of X. In block 42', the process may determine if there are any remaining bits of X to consider. If there are, then the process may proceed to block 43' and may load a next coefficient, $K_j$, corresponding to the bit position of the LSB of X. The process may then proceed to block 44' and may compute the product, $Y \cdot K_j$. Then, in block 45', the process may, based on the value of the current LSB of X, determine whether to load the product, $Y \cdot K_j$, as the next value of Y or to have Y remain the same. The process may then proceed to block 46' and may right-shift X, to provide a new LSB. The process may then loop back to block 42' to test if there are still bits of X to consider. If all bits of X have been considered, the process may proceed to block 47' in the case in which the apparatus operates only on the fractional portion of X. In block 47', the result obtained for the fractional portion of Y (corresponding to the fractional portion of X) may be left-shifted according to the integer portion of X, as discussed above, to account for the integer portion of X. After this shifting the process may be complete.

Figure 5:
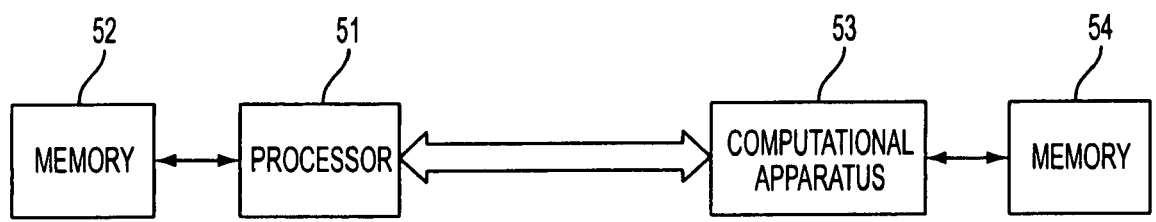
FIG. 5 depicts a system according to an embodiment of the invention.

In some embodiments of the invention, the apparatus, e.g., as shown in FIGS. 3A-3E, may be integrated into or coupled to a computing platform, where the computing platform may include at least one microprocessor. An example of such a system according to some embodiments of the invention is shown in FIG. 5. FIG. 5 shows a processor 51 that may be coupled to the computational apparatus 53, for example, as embodied in one of FIGS. 3A-3E. The coupling may be by means of any suitable connection, which may comprise, but is not limited to, one or more buses, wireless pathways, optical pathways, shared memories, etc. The computing platform may use, for example, the above-described methods to use embodiments of the inventive apparatus 53 to compute logarithmic and/or exponential functions. In such a system, processor 51 may transmit, for example, operands and/or a function selection signal to computational apparatus 53. Similarly, computational apparatus 53 may transmit, for example, a result back to processor 51.

Processor 51 may be furnished with associated memory 52, and computational apparatus 53 may be furnished with associated memory 54. Memories 52 and 54 may comprise any known or as yet to be discovered memory (e.g., RAM, ROM, etc.). Memory 52 may, for example, be used by processor 51 to store data and/or software. Memory 54 may, for example, be used by computational apparatus 53 to store coefficients and/or results. Additionally, memories 52 and 54 may be implemented in a common memory device, and in such a case, processor 51 and computational apparatus 53 may pass quantities between each other by storing them in shared memory locations. It may be noted, however, that all of the above are merely examples of implementations, and that the invention is not to be thusly limited.

Figure 6:
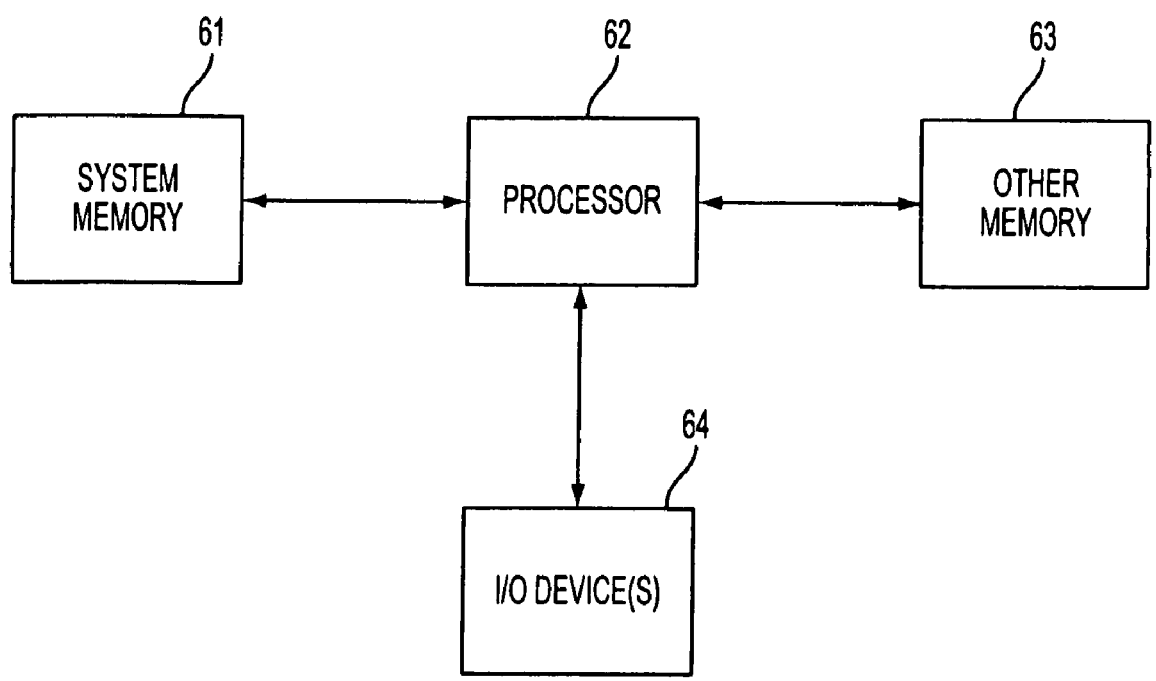
FIG. 6 depicts a conceptual block diagram of a computer system that may be used to implement an embodiment of the invention.

Some embodiments of the invention, as discussed above, may be embodied in the form of software instructions on a machine-accessible medium. Such an embodiment is illustrated in FIG. 6. The computer system of FIG. 6 may include at least one processor 62, with associated system memory 61, which may store, for example, operating system software and the like. The system may further include additional memory 63, which may, for example, include software instructions to perform various applications. System memory 61 and additional memory 63 may be implemented as separate memory devices, they may be integrated into a single memory device, or they may be implemented as some combination of separate and integrated memory devices. The system may also include one or more input/output (I/O) devices 64, for example (but not limited to), keyboard, mouse, trackball, printer, display, network connection, etc. The present invention may be embodied as software instructions that may be stored in system memory 61 or in additional memory 63. Such software instructions may also be stored in removable media (for example (but not limited to), compact disks, floppy disks, etc.), which may be read through an I/O device 64 (for example, but not limited to, a floppy disk drive). Furthermore, the software instructions may also be transmitted to the computer system via an I/O device 64, for example, a network connection; in this case, the signal containing the software instructions may be considered to be a machine-accessible medium.

The invention has been described in detail with respect to various embodiments, and it will now be apparent from the foregoing to those skilled in the art that changes and modifications may be made without departing from the invention in its broader aspects. The invention, therefore, as defined in the appended claims, is intended to cover all such changes and modifications as fall within the true spirit of the invention.

What is claimed is:

1. An apparatus, comprising:
a first register;
a second register;
selection logic coupled to said second register and a constant input value, wherein said selection logic is configured to select one of a coefficient or said constant input value to provide as an output in response to a select input, wherein the select input includes a least significant bit of an operand for which an exponential function is being performed by said apparatus; and
a multiplier coupled to said first register and to said output of said selection logic to provide a product of contents of said first register and said output of said selection logic, wherein said product is at least part of a result of said exponential function performed on said operand,
wherein said multiplier is further coupled to said first register to provide said product as an input to said first register.

2. The apparatus according to claim 1, wherein said coefficient is provided to said selection logic by said second register.

3. The apparatus according to claim 1, wherein one of said coefficient and said constant input value is provided by said selection logic to said second register to be second register contents, and wherein said second register contents are provided to said multiplier.

4. The apparatus according to claim 1, further comprising: a third register coupled to said multiplier to receive said product and to said first register to provide said product.

5. The apparatus according to claim 1, further comprising: a fourth register adapted to receive said operand and to provide said least significant bit of said operand to said select input of said selection logic.

6. The apparatus according to claim 1, wherein said selection logic comprises a multiplexer.

7. The apparatus according to claim 1, wherein said multiplier comprises a fractional unsigned multiplier.

8. A method, comprising:
loading, using a processor, a first operand into a first register;
selecting, using the processor, a second operand from one of an iteration-specific coefficient or a constant input value based on a least significant bit of a third operand for which an exponential function is being performed;
computing, using the processor, a product of said first and second operands, wherein said product is at least part of a result of said exponential function performed on said third operand; and
replacing, using the processor, said first operand with said product in preparation for a next iteration of said method.

9. The method according to claim 8, further comprising: loading, using the processor, said third operand into a selection register.

10. The method according to claim 9, wherein said loading said third operand comprises: initializing, using the processor, said third operand to a non-integer portion of a number on which to operate.

11. A system comprising:
at least one processor; and
a computational apparatus coupled to said at least one processor, said computational apparatus including:
first and second registers;
selection logic coupled to said second register and a constant input value, wherein said selection logic is configured to select one of a coefficient or said constant input value to provide as an output in response to a select input, wherein the select input includes a least significant bit of an operand for which an exponential function is being performed by said computational apparatus; and
a multiplier coupled to said first register and to said output of said selection logic to provide a product of contents of said first register and said output of said selection logic, wherein said product is at least part of a result of said exponential function performed on said operand, and
wherein said multiplier is further coupled to said first register to provide said product as an input to said first register.

12. The system according to claim 11, further comprising: at least one memory coupled to at least one of said at least one processor and said computational apparatus.

13. The system according to claim 11, said computational apparatus further comprising: a third register coupled to said multiplier to receive said product and to said first register to provide said product.

14. The system according to claim 11, said computational apparatus further comprising: a fourth register to receive said operand and provide said least significant bit of said operand to said selection logic.

15. The system according to claim 11, wherein said coefficient is provided to said selection logic by said second register.

16. The system according to claim 11, wherein one of said coefficient and said constant input value is provided by said selection logic to said second register to be second register contents, and wherein said second register contents are provided to said multiplier.

17. The system according to claim 11, wherein said selection logic comprises a multiplexer.

18. The system according to claim 11, wherein said multiplier comprises a fractional unsigned multiplier.

* * * * *